United States Patent [19]
Bleier et al.

[11] Patent Number: 5,837,984
[45] Date of Patent: Nov. 17, 1998

[54] SMT READER FOR SIM-CARD AND STANDARD CARDS

[75] Inventors: Robert Bleier, Untergruppenbach; Manfred Reichardt, Weinsberg, both of Germany

[73] Assignee: Amphenol-Tuchel Electronics GmbH, Heilbronn, Germany

[21] Appl. No.: 537,746

[22] PCT Filed: May 16, 1994

[86] PCT No.: PCT/EP94/01581

§ 371 Date: Nov. 14, 1995

§ 102(e) Date: Nov. 14, 1995

[87] PCT Pub. No.: WO94/27244

PCT Pub. Date: Nov. 24, 1994

[30] Foreign Application Priority Data

May 14, 1993 [DE] Germany .......................... 43 16 306.8

[51] Int. Cl.⁶ ............................. G06K 7/00; G06K 18/06
[52] U.S. Cl. .......................... 235/441; 235/486; 235/482
[58] Field of Search .................................. 235/441, 482, 235/492, 487, 375, 486; 439/260

[56] References Cited

U.S. PATENT DOCUMENTS

| | | | |
|---|---|---|---|
| 3,917,372 | 11/1975 | Selinko | 339/75 M |
| 4,236,667 | 12/1980 | Crowley et al. | 235/443 |
| 4,288,140 | 9/1981 | Griffith et al. | 339/75 R |
| 4,575,703 | 3/1986 | Shishido | 235/479 |
| 4,717,817 | 1/1988 | Grassi et al. | 235/441 |
| 4,724,310 | 2/1988 | Shimamura et al. | 235/483 |
| 4,734,567 | 3/1988 | Hansbauer | 235/482 |
| 4,735,578 | 4/1988 | Reichardt et al. | 439/152 |
| 4,752,234 | 6/1988 | Reichardt et al. | 439/260 |
| 4,770,639 | 9/1988 | Lau | 439/61 |
| 4,795,897 | 1/1989 | Chalendard | 235/482 |
| 4,799,891 | 1/1989 | Reichardt et al. | 439/43 |
| 4,814,593 | 3/1989 | Reichardt et al. | 235/482 |
| 4,874,323 | 10/1989 | Shibano | |
| 4,900,273 | 2/1990 | Pernet | 439/630 |
| 4,932,889 | 6/1990 | Bleier et al. | 439/260 |
| 4,975,086 | 12/1990 | Reichardt et al. | 439/629 |

(List continued on next page.)

FOREIGN PATENT DOCUMENTS

| | | |
|---|---|---|
| 139 593 | 5/1985 | European Pat. Off. . |
| 0 186 737 | 7/1986 | European Pat. Off. . |
| 214 478 | 3/1987 | European Pat. Off. . |
| 0 254 326 | 1/1988 | European Pat. Off. . |
| 274 534 | 7/1988 | European Pat. Off. . |
| 316 699 | 5/1989 | European Pat. Off. . |
| 0 333 530 | 9/1989 | European Pat. Off. . |
| 0 399 763 | 11/1990 | European Pat. Off. . |
| 2 489 558 | 3/1982 | France . |
| 2 607 287 | 5/1988 | France . |
| 2 633 750 | 1/1990 | France . |
| 2952442 A1 | 7/1980 | Germany . |
| 3343727 A1 | 6/1985 | Germany . |
| 3343757 A1 | 6/1985 | Germany . |
| 3402632 A1 | 8/1985 | Germany . |
| 3443561 A1 | 5/1986 | Germany . |
| 3531318 A1 | 3/1987 | Germany . |
| 36 02 668 A1 | 7/1987 | Germany . |
| 3602668 A1 | 7/1987 | Germany . |

(List continued on next page.)

OTHER PUBLICATIONS

Abstract of Japanese Published Pat. Appln. No. 60–022795, Patent Abstracts of Japan, Feb. 5, 1985.
IBM Technical Disclosure Bulletin vol. 20, No. 5, Oct. 1977, "Actuator Assembly for a Disk File".

*Primary Examiner*—Donald T. Hajec
*Assistant Examiner*—Thien Minh Le
*Attorney, Agent, or Firm*—Bacon & Thomas

[57] ABSTRACT

The invention is related to a SMT-reader for SIM-cards and standard cards, where in a contact block is used. The contact block is mounted by means of soldering to a circuit board and contacting said circuit board in accordance with surface mounting technology (SMT). A card guide means disposed separate from the contact block and adapted to guide the SIM card or standard cards.

12 Claims, 7 Drawing Sheets

U.S. PATENT DOCUMENTS

| | | | |
|---|---|---|---|
| 4,976,630 | 12/1990 | Schuder et al. | 235/482 |
| 5,196,680 | 3/1993 | Schuder | 235/449 |
| 5,259,777 | 11/1993 | Schuder et al. | 439/188 |
| 5,269,707 | 12/1993 | Reichardt et al. | 439/630 |
| 5,320,552 | 6/1994 | Reichardt et al. | 439/331 |
| 5,334,034 | 8/1994 | Reichardt et al. | 439/188 |
| 5,334,827 | 8/1994 | Bleier et al. | 235/492 |
| 5,336,877 | 8/1994 | Raab et al. | 235/482 |
| 5,369,259 | 11/1994 | Bleier et al. | 235/441 |
| 5,559,317 | 9/1996 | Wong et al. | 235/482 |

FOREIGN PATENT DOCUMENTS

| | | |
|---|---|---|
| 3625306 A1 | 1/1988 | Germany . |
| 3442397 A1 | 5/1988 | Germany . |
| 38 08 183 | 9/1988 | Germany . |
| 3810275 A1 | 10/1989 | Germany . |
| 40 08 655 | 1/1990 | Germany . |
| 3832588 A1 | 3/1990 | Germany . |
| 3931506 A1 | 4/1991 | Germany . |
| 40 29 576 | 3/1992 | Germany . |
| 41 18 312 | 12/1992 | Germany . |

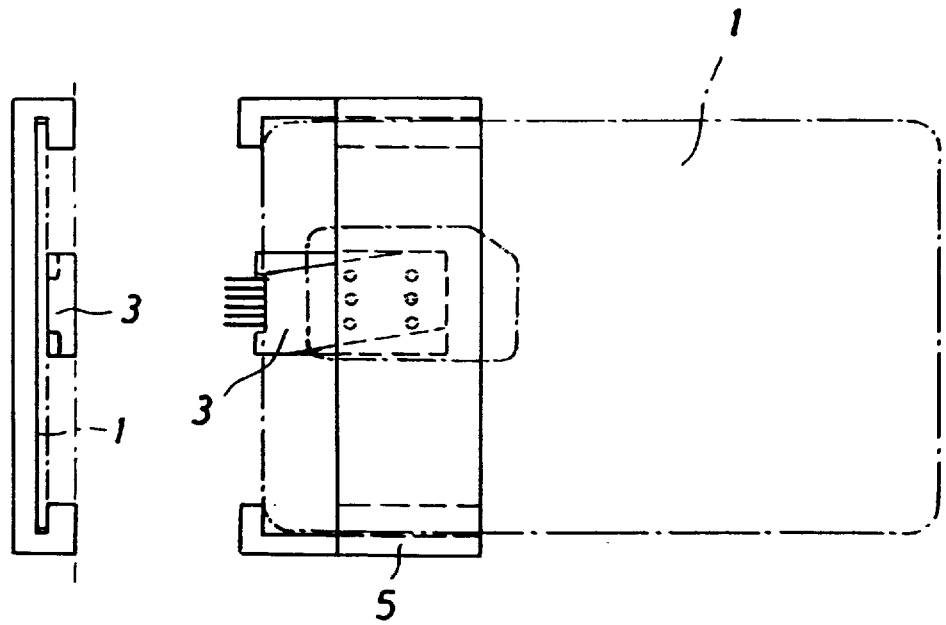
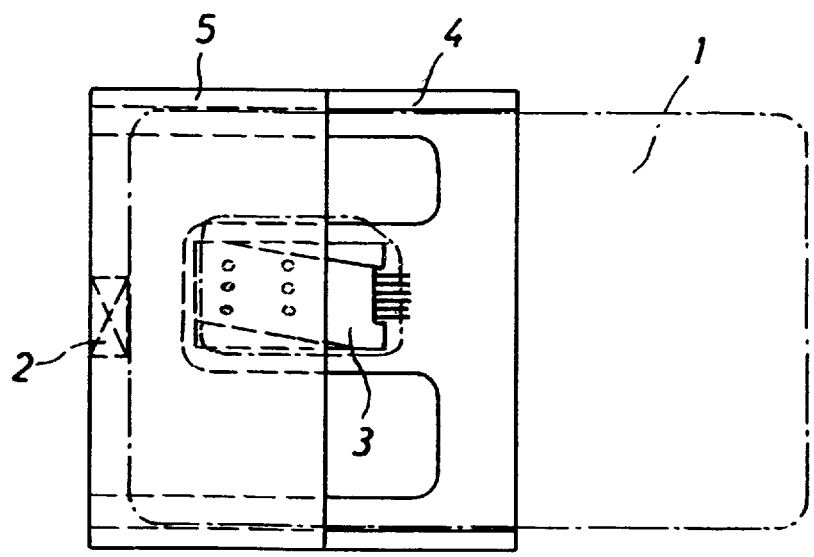
Fig. 3    Fig. 1
Fig. 2

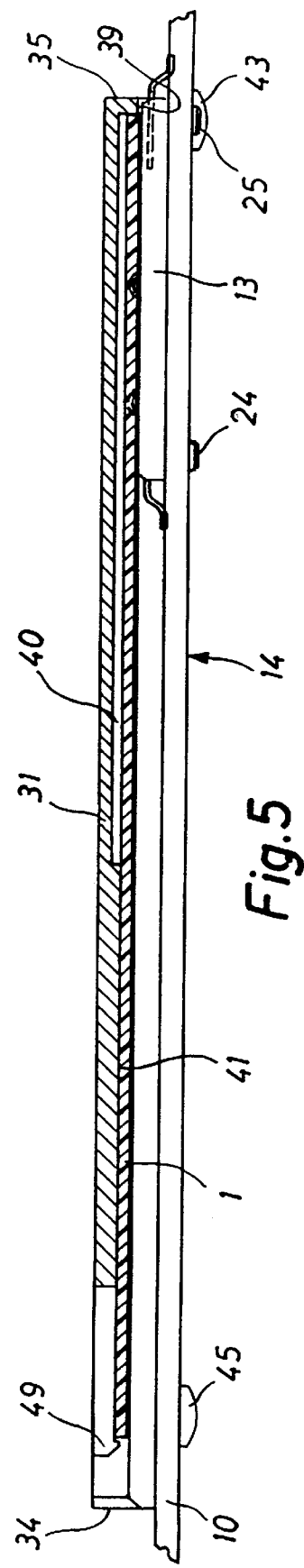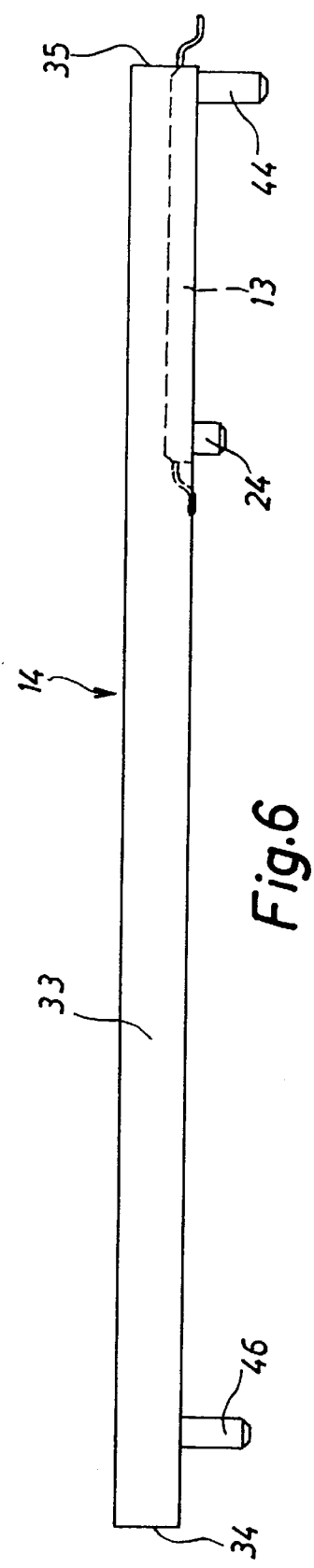

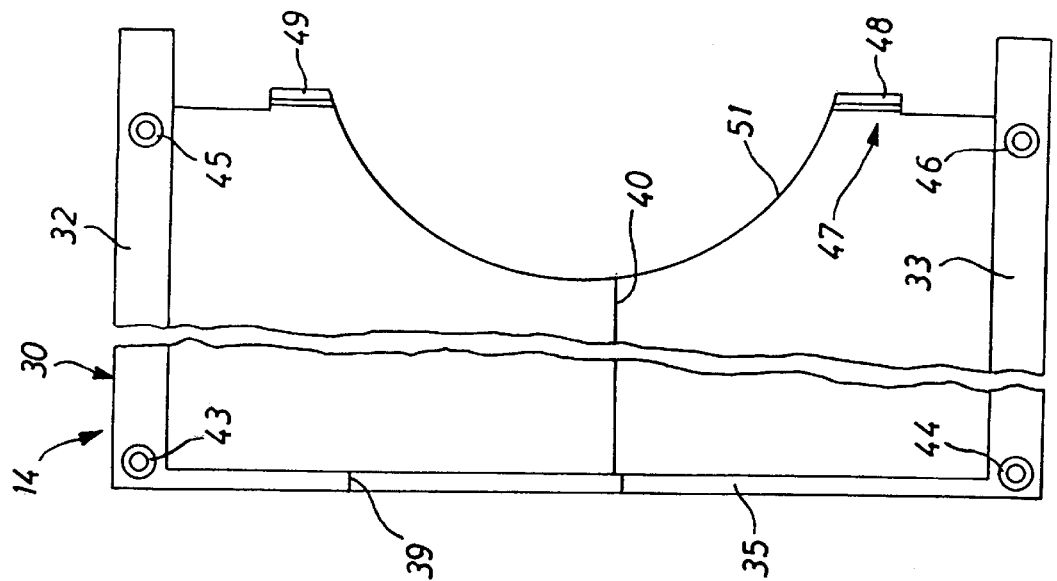
Fig.11
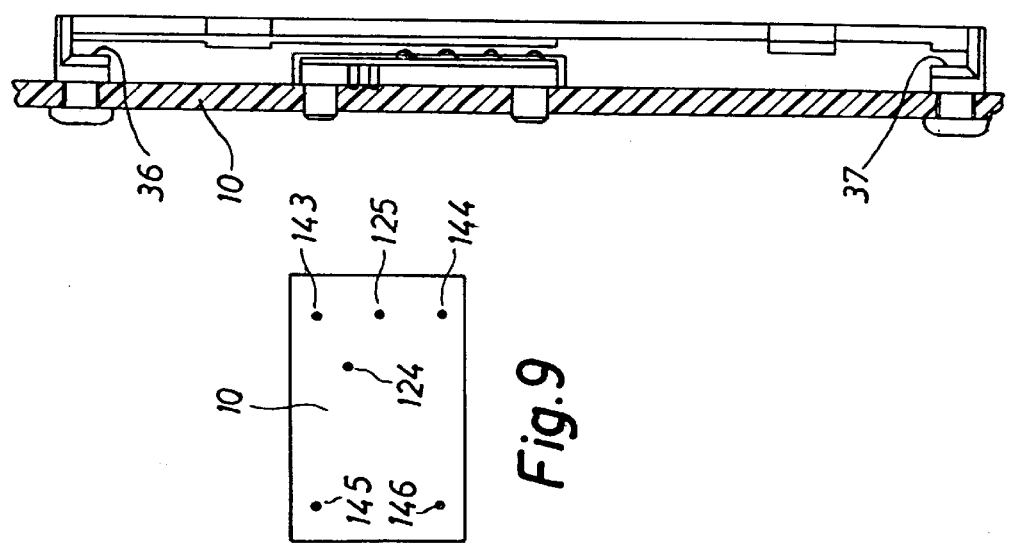
Fig.10
Fig.9
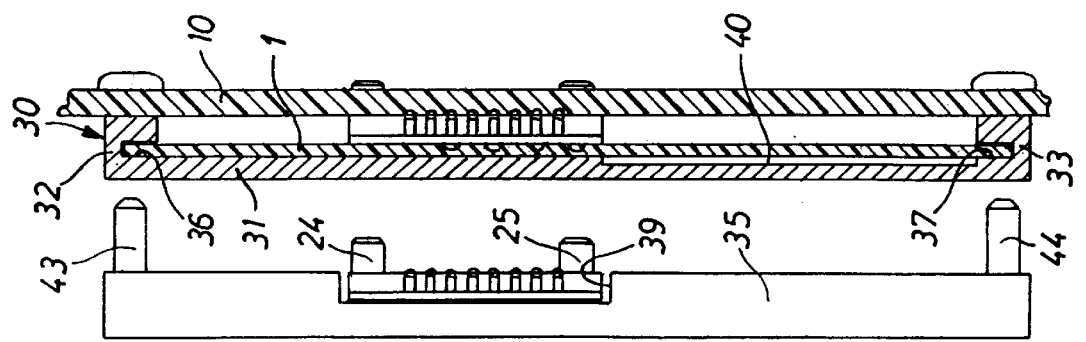
Fig.7  Fig.8

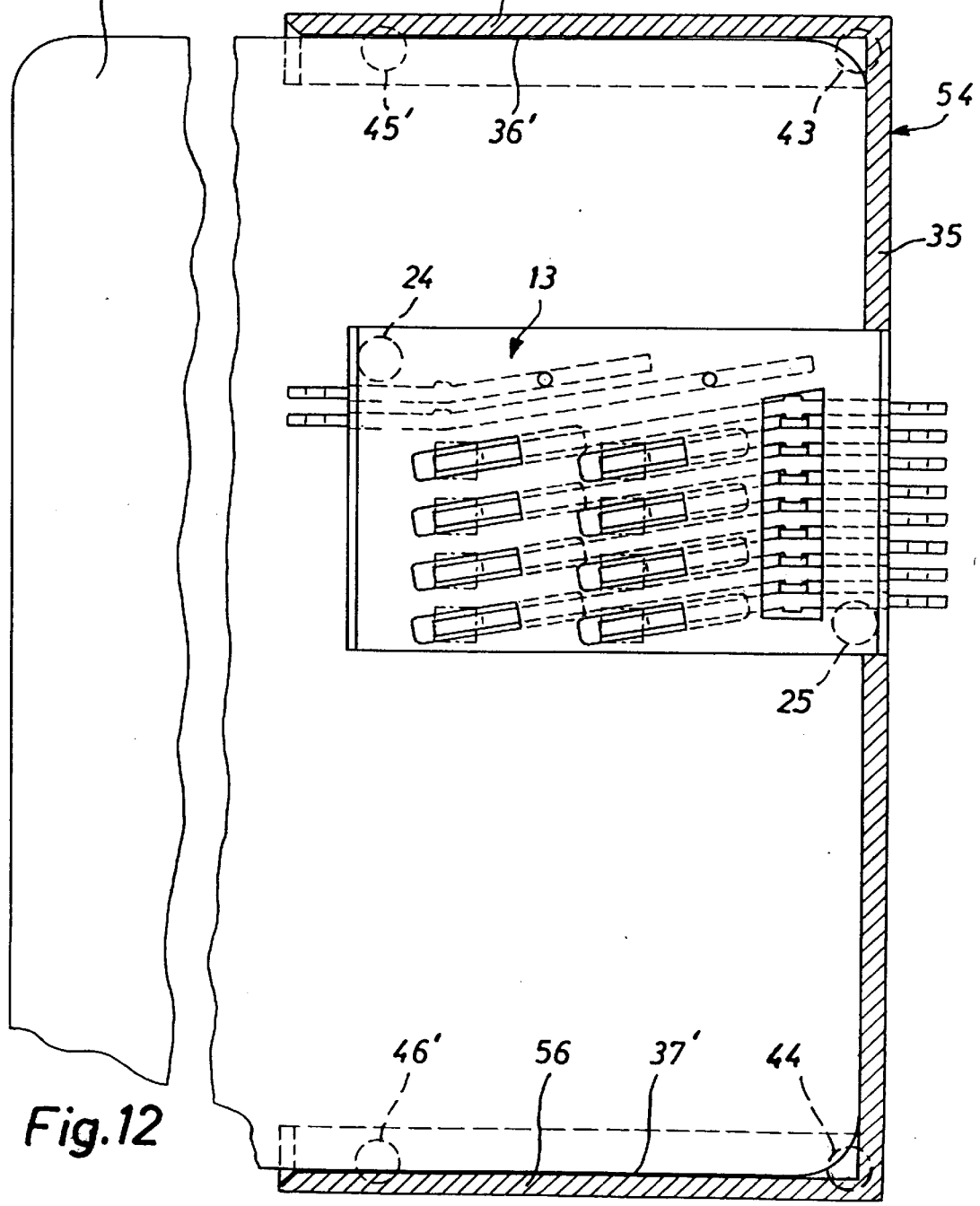

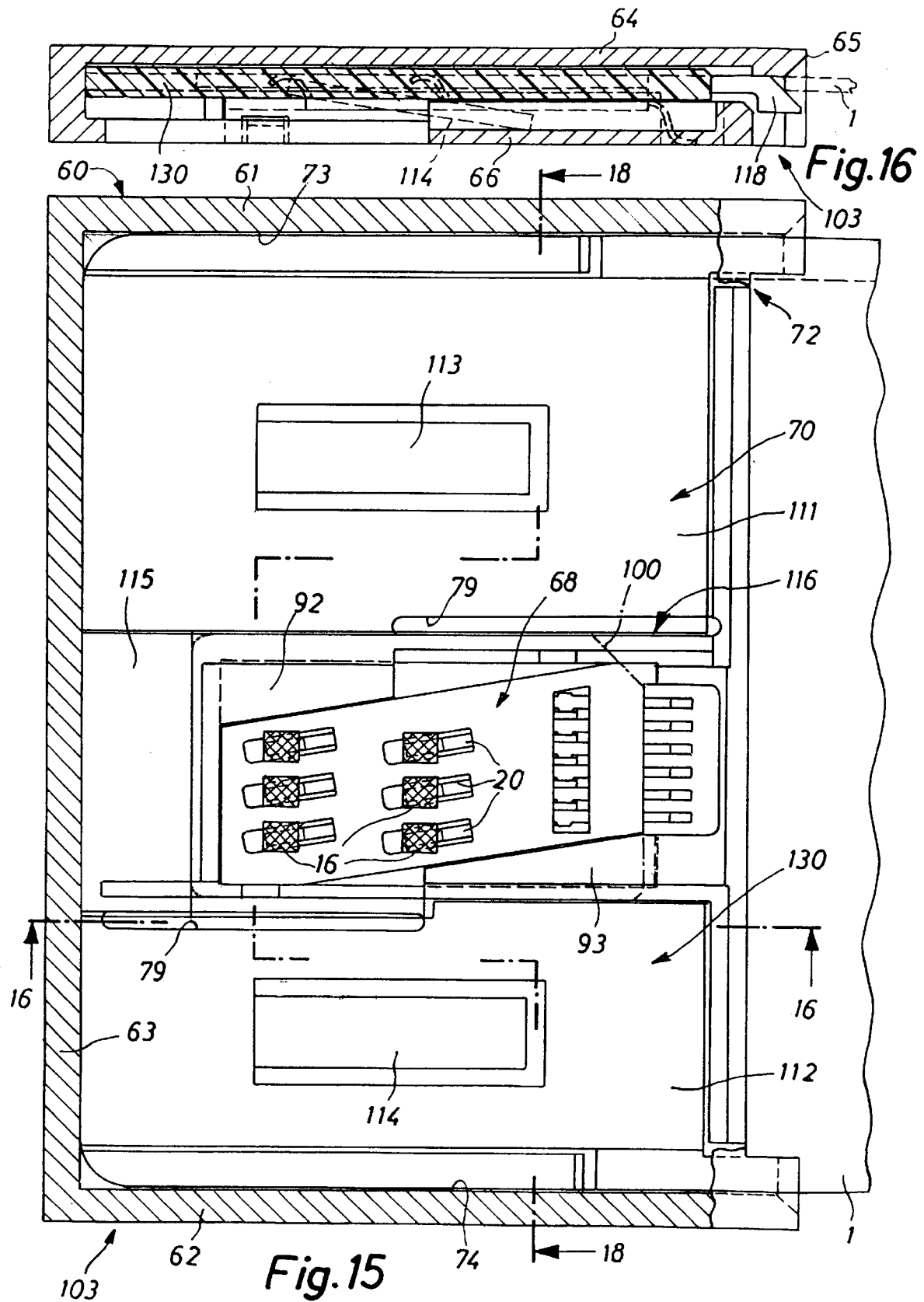

SMT READER FOR SIM-CARD AND STANDARD CARDS

BACKGROUND OF THE INVENTION

The present invention relates to a reader or a contacting apparatus adapted to be used for contacting both SIM-cards and standard chip cards.

The present invention relates more specifically to an SMT-reader.

The present invention addresses the problem of contracting large as well as a small cards by using a block having minimal dimensions and being in particular provided with separately arranged guide means, thereby providing a choice as to which of the two types of cards is to be used, while enabling the guide-means to be used as a shielding element and in addition providing invention should SMT-capability.

Due to the features of the invention, which will be explained below in some detail, the printed circuit board on which the reader is preferably to be arranged, can be more efficiently utilized, and the manufacturer of telephones does not have to design the products for a specific card.

Regarding the prior art, attention is drawn to the so-called "soldering-reader" which comprises a contact support formed by a frame. Such readers require a relatively large amount of space on the printed circuit board. Moreover, such readers cannot be used together with SMT-technology, and are not suitable for reading SIM-cards. DE—OS 40 29 546 describes a readier adapted to receive a large card or a small card. However, this type of reader has to be made in the factory for one of the different cards. The user himself has no choice as to which cards with which the reader can be used.

SUMMARY OF THE INVENTION

In accordance with the invention, a reader is provided that can read different types of chip card.

Also in accordance with the present invention a contact block is provided that is smaller or only a little bit larger than a GSM/SIM-card so that maximum free space is available for other components. The contacting block can be provided with centering and mounting means.

The soldering termination can project from the block either in the direction of insertion of the card, or in the opposite direction, and the contacting block can be provided with recesses which allow the block to be inserted through a bottom plate and held down by the plate.

The contacting block can be provided with other blocks in a continuous arrangement, and the block can have a surface for pick and place mounting.

The card guide means can be provided in the portion of the apparatus in which the block is used.

The card guide means can be an additional component made of plastic material, metallized plastic material or metal.

The metal guide means provides a direct contact to the printed circuit board.

The card guide means can be adapted to receive the card end position switch.

Second card guide means can be provided for receiving the SIM-card. The second guide-means can be separate or can be a component of the first guide-means. The receiving element of the second card guide-means for the SIM-card is movable perpendicular to the card planes, so that the card slot is opened up for using the large card.

The receiving element can be supported to be movable in elevated positions, or the receiving element can be supported on one side.

After the large card has been removed, the second card means returns to its starting position and is ready to receive the small card.

The end position switch can be actuated directly by the large card and can be actuated indirectly via the second card guide means by the small card.

In accordance with preferred embodiments of the present invention the contact block car, be used to design a standard card reader (short: a chipcard reader) and/or a SIM card-reader. The contact block comprises preferably in substance the circumferential dimensions of a SIM-card, so that said contact-block can be referred to in short as a SIM-block. Said SIM-block can also be used particularly together with a printed circuit board, so as to form a chip-card reader. As a printed circuit board, also a metal plate with a flex-print provided thereon can be used.

More specifically, in accordance with an embodiment of the invention, a chip card reader can be realized by fixedly mounting a contact block or a SIM-block on a printed circuit board or another component, wherein said block is preferably connected by the SIM-technology. The guide-means which are required for the chip-card are provided separately from the SIM-block, for instance by a frame which is arranged around said SIM-block and is fixedly mounted specifically to a printed circuit board, and guide-means for the side edges of the chip-card are provided in the frame. The mounting of the frame at the printed circuit board is preferably carried out by pins which are formed integrally with the frame out of a plastic material, the pins being adapted to be inserted into openings in the printed circuit board, and then subjected to a pressing action from the bottom side of the printed circuit board. Also, the mounting of the SIM-block at the printed circuit board is preferably carried out by pins which are integrally formed with the SIM-block or a plastic material. Preferably, the guide means also form detent means, so as to lock the card in the reading position, after the card has been inserted into the reader and has reached the reading position.

In accordance with another embodiment of the invention, a shortened version of the embodiment just described is provided by deleting the locking or detent means for the chip card and by providing the guide means only along about half of the chip card length.

In accordance with another embodiment of the present invention, a contact block which is also referred to as a SIM-block, is again used to realize a chip-card reader. However, in this embodiment, the contract block is designed such that it can also read SIM-cards. For this purpose, the SIM-block is suitably positioned with respect to the card guide-means and adapter means to make sure that the same reader can read or contact either a clip-card or a SIM-card. Due to the features of the present invention, chip-card readers or SIM-card readers are provided which can be produced at low cost, in particular because it is simpler to maintain a supply of the required components with the contact block being designed for reading or contacting SIM-cards as well as chip-cards.

Additional advantages, objects and details of the invention can be recognized from the description of embodiments of the invention referring to the attached drawings.

BRIEF DESCRIPTION OF THE DRAWINGS

FIGS. 1, 2 and 3 are schematic representations of a first embodiment of a reader having an SMT-design and which is capable of reading SIM-cards and standard cards;

FIG. 4 to 11 show a second embodiment of a chip-card reader of the invention, wherein FIG. 4 is a schematic plan view, FIG. 5 is a schematic sectional view along line 5—5, FIGS. 4 and 6 are side elevational views, FIG. 7 is a side elevation view of the chip-card reader in FIG. 4 from the right-hand side, FIG. 8 is a schematic cross-sectional view of the reader of FIG. 4, FIG. 9 is a plain view of a printed circuit board on a reduced scale, FIG. 10 is a schematic elevational view of the chip-card reader of FIG. 4 from the left-hand side, and FIG. 11 is a plan view onto the bottom side of the frame of the chip-card reader of FIG. 4, said frame forming the guide-means for the chip-card;

FIGS. 12 to 14 are directed to a third embodiment of the invention with FIG. 12 showing a top plan view similar to FIG. 4, and FIG. 13 and 14, respectively, showing a sectional view and a side elevational view, respectively, similar to FIGS. 5 and 6, respectively;

FIGS. 15 to 21 show a fourth embodiment of a chip-card reader and/or SIM-card reader, wherein FIG. 15 illustrates a schematic plan view of the reader, FIG. 16 is a schematic sectional view along line 16—16 in FIG. 15, FIG. 18 is a side elevational view of the reader in FIG. 15 from the right-hand side, and FIG. 19 is a schematic cross-sectional along line E—F in FIG. 15, whereas FIG. 19 shows a chip-card having embossings, while in FIG. 20 a standard chip-card is shown as been inserted and wherein FIG. 21 shows a SIM-card being inserted into the reader.

DETAILED DESCRIPTION OF THE PREFERRED EMBODIMENT

Figure 4:
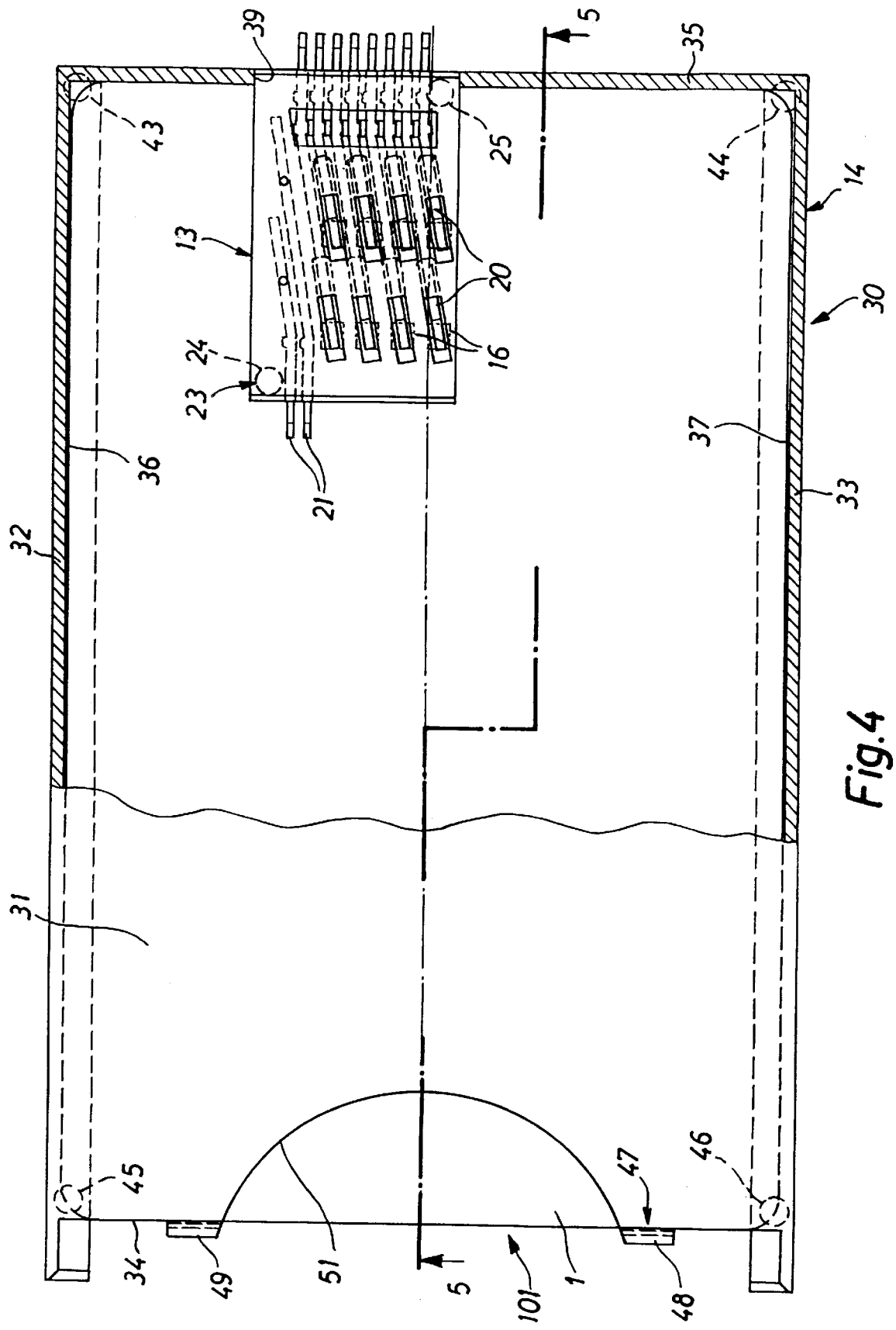

In FIGS. 1, 2 and 3 a chip-card 1 can be recognized which has actuated, in accordance with FIG. 2, an end-position switch 2. First guide-means 5 as well as second guide-means 4 are provided together with a contact-block 3.

The following advantages are achieved by the invention as will be described in more detail below:

1. Mounting of the reader on a printed circuit board is possible; using surface mount technology (SMT),
2. There is a maximum of free apace available for components on this circuit board;
3. It is possible to selectively use large cards and small cards (SIM)-cards;
4. It is easy to provide for shielding means;
5. The card guide-means can alternatively be a part of the apparatus in which the chip-card reader is used;
6. Manufacturing costs are minimized.

In FIGS. 4 to 11 a second embodiment of a chip-card reader 101 is disclosed. The clip-card reader 101 is preferably formed by a printed circuit board 10 on which a contact block 13 is fixedly mounted. Guide-means 14 (see FIG. 4) are provided for guiding the chip-card 1 when the chip-card is moved into a reading position. The guide-means 14 surround the contact block 13 in the proper manner, so that the card contacts 16 of the chip-card 1 are aligned with the respective contact elements 20 of the contact block 13 when the reading position is reached. The contact elements 20 have terminations or termination ends 22 which are preferably suitable for an SMT-design. Further, contact-elements 21 for an end-position switch are provided. The contact-block 13, which can also be referred to as a SIM-block because the sides of said block correspond approximately to the size of the contact field of a SIM-card, comprises mounting means 23 by means of which the block can be fixedly mounted to the printed circuit board. The mounting is preferably provided in the form of two pins, which preferably are two diagnonally opposite pins 24 and 25 and are integrally formed with the SIM-block 13 of a plastic material. The SIM-block 13 consists in substance of an insulating body, in which the contact elements 20 are arranged, for instance in chambers. It is very simple to keep a supply of the SIM-block 13, depending on the requirement as to whether a reader should be created for a standard or a SIM-Card which can be fixedly mounted to a printed circuit board. Such a printed circuit board 10 is shown schematically and on a drastically reduced scale in FIG. 9 FIG. 9 shows the bores 124 and 125 adapted to receive pins 24 and 25 of the contact block 13. Preferably, pins 24 and 25 project through and beyond the circuit board 10 so far that they can be pressed against the circuit board so as to provide for the mounting of the contact block at the circuit board. As shown, the circuit board 13 has a generally rectangular shape, the contact elements 20 for the card contacts 16 project preferably with one side of the termination ends 22 and are adapted to come into a resilient contact engagement with the conductive or conduit path on the printed circuit board.

The guide means 14 for the chip-card 1 comprise in substance the frame 13, the longitudinal cross-section of which is preferably U-shaped. Frame 13 forms an upper wall 31, a first side wall 32, a second side wall 33 and a front wall 34 as well as a back wall 35. In each of the first and second side walls longitudinal slots 36 and 37 are provided for guiding the card 1. The frame 30 is preferably made of plastic material. In the back wall 35 a cut-out 39 (FIG. 7) is provided to provide access to the contact-block 13. A recess 40 (FIG. 8) in the upper wall 31 allows the insertion of a chip-card 1 having embossings. The upper wall 31 also forms guide engagement surfaces 41 facing towards the card 1 (see FIG. 5) so that the card 1 is pressed against the contact elements 20 with its card contacts 16 in a safe contacting manner after the reading position shown in FIG. 8 has been reached.

The frame 30 is fixedly mounted to the circuit board 10 by means of mounting means which are preferably formed by pins 43, 44, 45 and 46. The pins are preferably integrally formed together with the frame 30 of plastic material, and are adapted to be inserted into the holes 143, 144, 145 and 116 of the circuit board 10 as shown schematically in FIG. 9, whereby the ends of the pins extending beyond the bottom side of the circuit board 10 are pressed against said bottom the in the manner shown in FIG. 5. Preferably, the length of the upper wall 31 is designed such that at the free end of the wall detent means 47 preferably in the form of detent hooks 48, 49 are provided, so as to lock the chipcard 1 in its reading position. Preferably adjacent to the detent or locking means 48, 49 a gripping section 51 is provided in the upper wall 31, so that the card 1 can be removed from the reading position.

A third embodiment of the invention is shown in FIG. 12 through 14. According to this embodiment a chip-card reader 102 is provided which uses the same SIM block 13 as the embodiment of FIGS. 4 through 11, are previously described. Different from the preceding embodiment, however, the guide means for the chipcard are formed by a frame 54 having preferably a U-shaped cross section. The frame is generally of the same design as frame 30, but with shorter side walls 54, 56 which also form shorter longitudinal slots 36', 37'. In this manner a more compact design is obtained. The pins 46' are closer to the pins 44 due to the shorter design.

FIGS. 15 through 21 disclose a fourth embodiment of the invention i.e. a reader 103 which can be used both as a chipcard reader as well as a SIM card reader.

Reader 103 comprises a housing 60. The housing 60 has a first side wall 61, a second side wall 62, a rear wall 63, an upper wall 64 and front wall 65. Besides the housing 60, reader 103 also comprises a contact block, referred to as a SIM block 68. Said SIM block 68 is similar but differs from the contact block 13 of the preceding embodiments. Further, reader 103 comprises an adapter plate 130 which makes it possible for either a standard card or chip-card 1 or a SIM card to be read (see the circumference shown at 100) i.e. a smaller card than the chip-card 1 can be read. In both cases, the contact fields formed by the card contacts 16 of the chip-card or the SIM card are the same or similar.

For guiding the chipcard 1, guide-means 72 are provided which are formed in accordance with the invention preferably by guide slots 73 and 74 of the side walls 55, 56. Slots 73, 74 extend in substance parallel to the upper side 90 (FIG. 21) of the contact block. The slots 73, 74 are further arranged such that the adapter plate 20 is moved away when the chip-card 1 is inserted, so that the card contacts 16 of the chip-card 1 come into engagement with the contact elements 20 of the contact block 68 preferably in a resilient manner.

Recesses 75, 76 (see FIG. 19) are provided in the upper wall 64.

Figures 17, 18, 19, 20, 21:
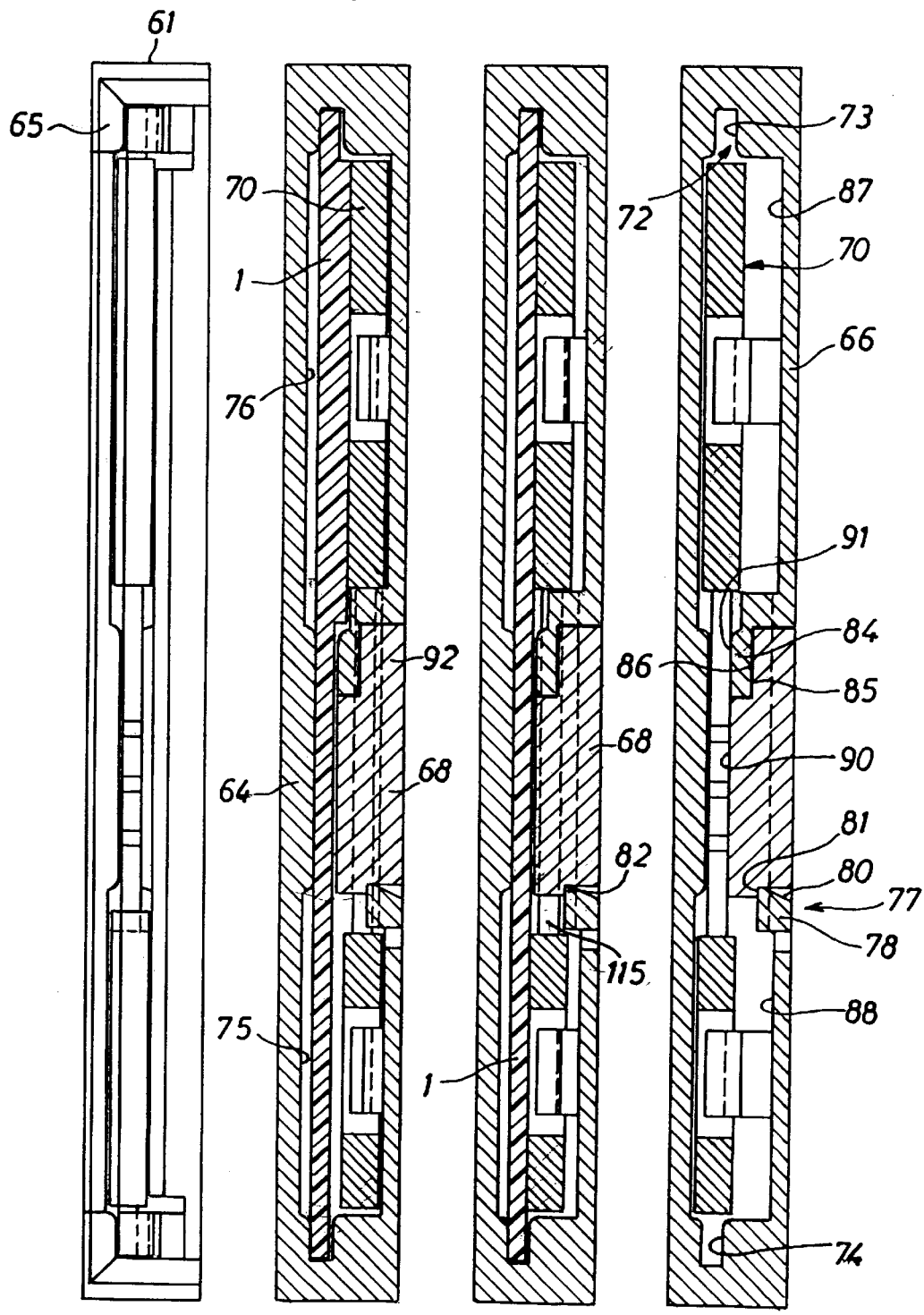

Moreover, the housing 60 forms detent means 77 (FIG. 21) which serve the purpose of mounting the contact block 68 in its operating position in tie housing 60, preferably by detent action. In more detail, the detent means 77 comprise two diametrically oppositely arranged detent arms 78. FIGS. 19 through 21 show only one of the detent arms 78 clearly, while the detent arm which is arranged preferably diagonally oppositely can not be recognised. The detent arms 78 are preferably formed by the bottom wall 66 of the housing 60 using slots 79. The detent arm 78 comprises an inclined surface 80 so as to simplify the insertion of the contact block 68. Moreover the detent arm 78 comprises a detent surface 81 which co-operates with counter detent surface 32 at the contact block 68.

As can be recognised best in FIG. 21 the bottom wall 66 forms a preferably angled arm 84 which forms an engagement surface 85 which can be in a abutment with a counter engagement surface 86 of the contact block 68.

Moreover the bottom wall 66 forms (see again FIG. 21) two recesses 87, 88.

The contact block 68 comprises spring elements 20. The spring elements 20 are preferably biased and are preferably of an inclined design in the area where they contact the card contacts 16. Parallel to the above mentioned upper surface 90 extends an upper side 91 formed by the housing 60 in an aligned manner.

A SIM card 100 (as already mentioned) is schematically shown in FIG. 15 by its circumference.

The adapter means of the present invention, which are in the form of an adapter plate, 70 allow the selective insertion of a chip-card 1 or of a SIM card 100. The adapter plate 70 comprises two plate portions 111 and 112, each of which comprises a spring element 113 and 114, respectively. The spring elements 113, 114 are in engagement with the inner upper surface of the bottom wall 66. An intermediate portion 115 (FIG. 20) connects said two plate portions 111 and 112. A SIAM card guide means 116 is provided for the insertion of the SIM card 100. Both plate portions 111, 112 further form at its lateral edges actuating arms 118 which—as shown in FIG. 16—make a downward movement of the adapter plate 70 impossible, so that a regular or a standard chip card 1 can be transferred into the reading position, guided by guide means 72, 73, 74, without being impeded by the adapter plate 70.

FIGS. 19 and 20 each disclose an inserted chip card; FIG. 19 shows a chip-card 1 with an embossing, while FIG. 20 shows a regular chipcard, i.e. a chip-card without embossing. It can be readily recognized, that the adapter plate 70 is moved against the action of the spring elements 113, 114. Thus, when the chip-card 1 is pulled out of the housing 6, thanks to a cut out (which is not shown here) for gripping the card, then the adapter plate 70 will return to the position shown in FIG. 21.

In the representation of FIG. 21, the SIM card 100 is inserted, i.e. the SIM card is located in an opening preferably formed by the adapter plate 70 and the SIM card is pressed resiliently against the contact elements 20 of the SIM block 68.

The SIM block 68 is, as mentioned, previously mounted in the bottom wall 66 preferably by the action of detent means. The SIM block is further provided with wings 92, 93 which provide for a safe abutment at the respective parts of the housing 60.

We claim:

1. A contacting apparatus for a chip card or a SIM card, said contacting apparatus comprising:

a printed circuit board, a contact block mounted by means of soldering to the circuit board and contacting said circuit board in accordance with surface mounted technology (SMT) and card guide means disposed separate from the contact block and adapted to guide the chip card or the SIM card, wherein said card guide means is mounted to the circuit board, and wherein further guide and mounting means for the mounting of the contact block to the circuit board and for the mounting of the card guide means to the circuit board are each formed by pins which are manufactured integrally together with the contact block and the card guide means, respectively, of plastic material.

2. Contacting apparatus of claim 1, wherein the contact block is smaller or only slightly bigger than a GSM/SIM card so as to leave on the circuit board a maximum of free space for the components.

3. Contacting apparatus of claim 1, wherein the contact block comprises recesses which allow the block to be inserted through a bottom plate and held down by said bottom plate.

4. Contacting apparatus of claim 1, wherein the card guide means is made of metal or a metallized plastic material.

5. Contacting apparatus of claim 1, wherein the card guide means is provided as a separate frame.

6. Contacting apparatus for a standard chip card according to claim 1, wherein the contact block has the circumference of a SIM card so that it forms a SIM block for contacting the chip card, and that the chip card is completely guided within a frame and housing, respectively.

7. Contacting apparatus of claim 6, wherein the card can be locked in the frame.

8. Contacting apparatus of claim 6, wherein the frame is adapted to receive only a partial area of the card.

9. Contacting apparatus of claim 1, wherein the pins are inserted into respective bores of the circuit board and the ends of the pins extending through the circuit board are pressed for the purposes of mounting.

10. Contacting apparatus of claim 5, wherein the separate frame comprises mounting means in the form of pins which are insertable into respective openings of the circuit board and wherein the free ends of the pins are pressed for purposes of mounting.

11. Contacting apparatus of claim 1, wherein the contact block comprises contact elements which extend slightly inclined with respect to the longitudinal axis of the housing.

12. Contacting apparatus adapted to receive selectively a SIM card or a standard chip card comprising a housing with guide means for a chip card and receiving means for a SIM card, wherein adapter means in the form of an adapted plate are provided, which are actuated when inserting a chip card by the chip card, so as to allow the contacting of the chip card, wherein the adapter plate extends with actuating arms into the area of insertion of the chip card into said housing so as to be pressed away when the card enters said housing.

\* \* \* \* \*

UNITED STATES PATENT AND TRADEMARK OFFICE
CERTIFICATE OF CORRECTION

PATENT NO. : 5,837,984
DATED : November 17, 1998
INVENTOR(S) : BLEIER et al.

It is certified that error appears in the above-indentified patent and that said Letters Patent is hereby corrected as shown below:

Column 1, line 11, change "contract-" to --contact- --;
        line 29, change "readier" to --reader--.

Column 2, line 11, change "car " to --card--;
        line 53, change "clip" to --chip--.

Column 3, line 40, change "apace" to --space--;
        Line 50, change "clip" to --chip--.

Column 4, line 41, change "116" to --146--.

Column 7, line 7, change "adapted" to --adapter--.

Signed and Sealed this

Sixth Day of July, 1999

Attest:

Q. TODD DICKINSON

*Attesting Officer*   Acting Commissioner of Patents and Trademarks